(12) United States Patent
Fujii et al.

(10) Patent No.: US 6,416,008 B1
(45) Date of Patent: Jul. 9, 2002

(54) SEAT BELT RETRACTOR

(75) Inventors: Hiroaki Fujii; Hiroshi Kajiyama, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/671,148

(22) Filed: Sep. 28, 2000

Related U.S. Application Data

(60) Provisional application No. 60/156,944, filed on Sep. 30, 1999, and provisional application No. 60/160,773, filed on Oct. 21, 1999.

(51) Int. Cl.$^7$ .............................................. B60R 22/28
(52) U.S. Cl. .................... 242/379.1; 280/806
(58) Field of Search ...................... 242/379.1; 280/805, 280/806; 297/470, 471, 472, 478

(56) References Cited

U.S. PATENT DOCUMENTS

| | | | | |
|---|---|---|---|---|
| 4,273,361 A | * | 6/1981 | Takei et al. .................. | 280/805 |
| 5,558,295 A | * | 9/1996 | Bauer ....................... | 242/379.1 |
| 5,660,347 A | | 8/1997 | Bäker ....................... | 242/379.1 |
| 6,105,894 A | * | 8/2000 | Singer et al. ............. | 242/379.1 |
| 6,206,315 B1 | * | 3/2001 | Wier ........................ | 242/379.1 |

FOREIGN PATENT DOCUMENTS

| | | |
|---|---|---|
| JP | 10-35411 | 10/1998 |

* cited by examiner

*Primary Examiner*—John M. Jillions
(74) *Attorney, Agent, or Firm*—Foley & Lardner

(57) ABSTRACT

The invention provides a seatbelt retractor comprising at least: a spool for taking up a seatbelt, a lock mechanism having a locking member whereby rotation in the direction of extracting the seatbelt is obstructed in the event of an emergency, a torsion bar rotatably linking the spool and the locking member, and capable of being deformed by twisting and a seatbelt load restricting mechanism for restricting the load placed upon the seatbelt. The torsion bar deforms by twisting at the time that the rotation of the locking member in the direction of the seatbelt being extracted is obstructed. The spool rotates relative to the extraction direction of the seatbelt. The restriction load properties of the seatbelt load restricting mechanism comprise a relatively small restriction load due to twisting deformation of the torsion bar alone, and a relatively great restriction load made up of a restriction load due to twisting deformation of the torsion bar and a restriction load due to another member. The relatively great restriction load is set to have properties which change in a plurality of steps.

20 Claims, 11 Drawing Sheets

20, 21

20, 21

20, 21

20, 21

20, 21

20, 21

20, 21

20, 21

20, 21   26

26   20, 21

26   20, 21

26   20, 21

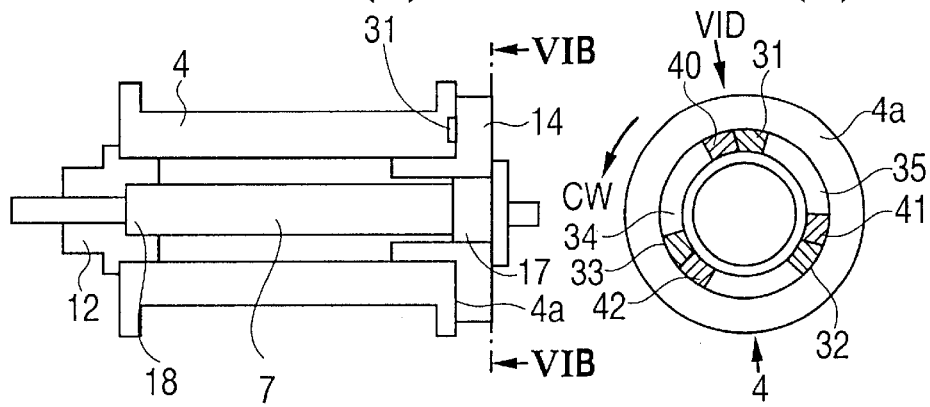
FIG. 6(a)
FIG. 6(b)
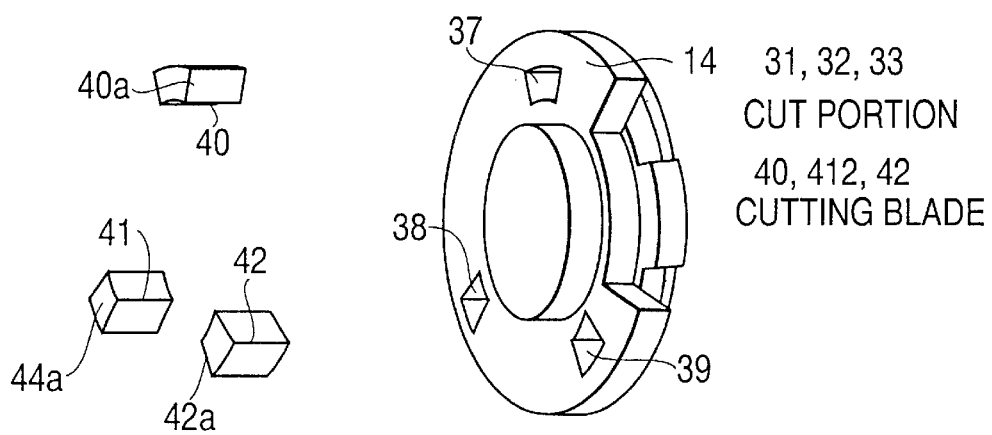
FIG. 6(c)
31, 32, 33 CUT PORTION
40, 412, 42 CUTTING BLADE
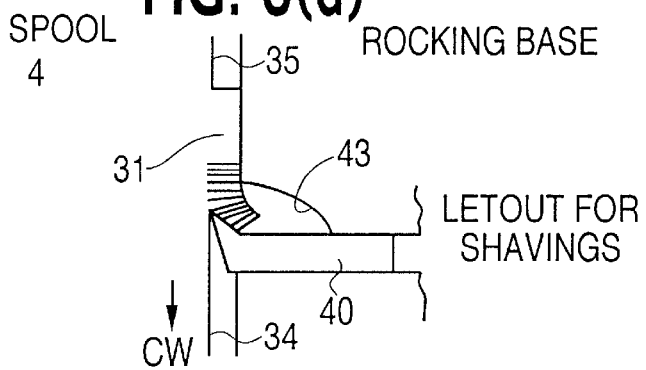
FIG. 6(d)

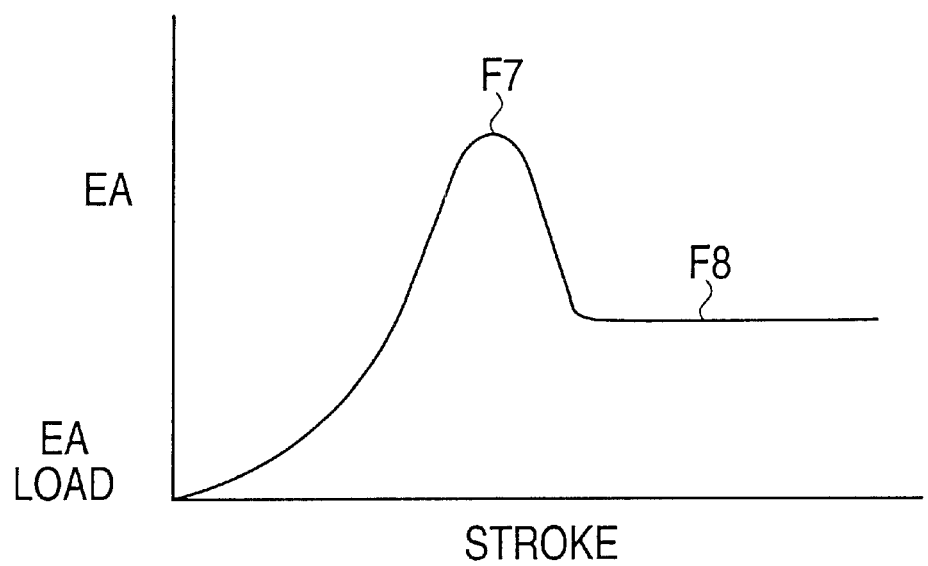

DIMENSIONS OF $\gamma, \delta, \varepsilon,$ and $\zeta$

SEAT BELT RETRACTOR

This application claims the benefit of U.S. Provisional Application No. 60/156,944, filed Sep. 30, 1999, and U.S. Provisional Application No. 60/160,773, filed Oct. 21, 1999, the disclosures of which are hereby incorporated by reference in their entirety.

FIELD OF INVENTION

The present invention generally relates to a seatbelt retractor which takes up a seatbelt so as to be windable and extractable and more specifically relates to a seatbelt retractor having a seatbelt load restricting mechanism.

BACKGROUND OF THE INVENTION

Conventionally, seatbelt devices are provided in vehicles, such as automobiles, in order to restrain the passengers in the event of emergencies. The seatbelt devices help restrain passengers in their seats, thereby protecting the passengers.

Modern seatbelt devices typically have seatbelt retractors for taking up the seatbelt. The seatbelt retractor is arranged such that, in the event the seatbelt is not being worn, the seatbelt is taken up on a spool. In the event that the seatbelt is worn, the seatbelt is extracted and worn by the passenger and excess webbing is taken up on the spool. Further, the seatbelt retractor is arranged such that a lock mechanism operates in the event of an emergency. The lock mechanism hinders the rotation of the spool in the direction of extracting the seatbelt, thereby impeding the extraction of the seatbelt. Thus, the seatbelt restrains and protects the passenger in the event of an emergency.

With conventional seatbelt retractors and seatbelt devices, a rapid vehicular deceleration occurring while the seat belt is worn results in great inertia that moves the passengers forwards. Thus, an increased load is placed on the seatbelt and the passenger is subjected to an increased shock force from the seatbelt. This shock force on the passenger is not necessarily a problem. However, it is desired to reduce this force. Accordingly, conventional seatbelt retractors have been developed with a torsion bar, so as to restrict the load placed upon the seatbelt in the event of an emergency while the seatbelt is worn.

FIG. 11 is a cross-sectional diagram illustrating an example of a seatbelt retractor having such a torsion bar. In the Figure, reference numeral 1 denotes a seatbelt retractor, 2 denotes a frame in the shape of a box with one end open and 3 denotes a seatbelt. Numeral 4 denotes a spool which is rotatably supported by both side walls of the frame 2. The spool 4 takes up the seatbelt 3. Numeral 5 denotes a deceleration detecting means. The detecting means 5 detects vehicular deceleration generated in the event of an emergency and operates accordingly. Numeral 6 denotes a lock mechanism. The deceleration detecting means 5 activates the lock mechanism 6. The lock mechanism 6 hinders the rotation of the spool 4 in the direction of extracting the belt. Numeral 7 denotes a torsion bar which is movably mounted. The torsion bar 7 passes through the center of the spool 4 in the axial direction and rotationally links the spool 4 and the lock mechanism 6. Numeral 8 denotes a first spring for perpetually pressing the spool 4 in the direction of taking up the belt. A second spring 9 works in conjunction with the first spring 8 via a bushing 10. Numeral 11 denotes a pretensioner which generates belt take-up torque in the event of an emergency. Numeral 12 is a bushing for transmitting the seatbelt take-up torque from the pretensioner 11 to the spool 4.

The lock mechanism 6 is provided with a locking base 14 which is capable of integrally rotating with a later-described first torque transmitting shaft 17 of the torsion bar 7. The lock mechanism 6 also holds a pawl 13 in a manner capable of rocking. The torsion bar 7 is provided with a lock gear 6a which normally rotates integrally with the torsion bar 7 but stops in the event of an emergency by the operation of the deceleration detecting means 5. The lock gear 6a generates a relative rotational difference with the torsion bar 7 and engages the pawl 13 with inner teeth 19 on the side wall of the frame 2. The engagement of the pawl 13 with the inner teeth 19 hinders rotation of the locking base 14. Thus, the spool 4 stops in the direction of extracting the seatbelt.

A first torque transmitting portion 17, which engages the locking base 14 in a manner incapable of relative rotation, is formed on the torsion bar 7. A second torque transmitting portion 18 is formed on the torsion bar 7. The second torque transmitting portion 18 engages the spool 4 in a manner incapable of relative rotation.

The spool 4 is perpetually pressed by the spring force of the spring 8 in the direction of taking up the seatbelt. The spring 8 acts via the bushing 10, torsion bar 7, second torque transmitting portion 18 of the torsion bar 7, and the bushing 12. Also, in the event of the pretensioner 11 operating, the belt take-up torque generated at the pretensioner 11 is transmitted to the spool 4 via the bushing 12. Thus the spool 4 takes up a predetermined amount of the seatbelt 3.

With conventional seatbelt retractors 1 thus configured, the seatbelt 3 is completely taken up by the pressing force of the spring means 8 when the seatbelt is not being worn. Extracting the seatbelt 3 at a normal speed for wearing causes the spool 4 to rotate in the seatbelt extracting direction, which allows the seatbelt 3 to be extracted smoothly. An tongue (not shown) provided to the seatbelt 3 is inserted into and retained by a buckle fixed to the vehicle body. The portion of the seatbelt 3 which has been excessively extracted is taken up by the spool 4 by the pressing force of the spring means 8. Thus, the seatbelt 3 is adjusted so that the passenger does not feel too tight.

In the event of an emergency, the seatbelt take-up torque generated by the pretensioner 11 is transmitted to the spool 4. The spool 4 takes up the seatbelt 3 by a predetermined amount, thereby securely restraining the passenger. Under rapid vehicular deceleration generated in the event of an emergency, the deceleration detecting means 5 activates the lock mechanism 6. That is, the rotation of the lock gear 6a in the direction of extracting the seatbelt is obstructed by the operation of the deceleration detecting means 5. The pawl 13 of the lock mechanism 6 rotates and engages the inner teeth 19 of the side wall of the frame 2. This impedes the rotation of the locking base 14 in the direction of extracting the seatbelt. The spool 4 alone rotates in the direction of extracting the seatbelt relative to the locking base 14. Subsequently, the spool 4 rotates in the direction of extracting the seatbelt while twisting the torsion bar 7. Therefore, the load placed on the seatbelt 3 is restricted by the twisting torque of the torsion bar 7. Thus, the shock to which the passenger is subjected is absorbed and alleviated.

An energy absorbing (EA) mechanism is formed by the torsion bar 7. The properties of load restriction under this EA mechanism at this time (hereafter also referred to as EA load) are such that the load restricted by the torsion bar 7 gradually increases as the stroke of relative rotation of the spool 4 to the locking base 14 increases. This is shown by the dotted line in FIG. 2(a). The load later becomes a constant value F1.

Additionally, the conventional seatbelt retractor 1 is arranged so that the locking base 14 of the lock mechanism 6 rotates in the direction of extracting the seatbelt relative to the lock gear 6a if seatbelt is rapidly extracted. Accordingly, the pawl 13 of the lock mechanism 6 engages the inner teeth 19 of the side wall of the frame 2 in the same manner as above. Thereby, the rotation of the locking base 14 is obstructed. Therefore, the rotation of the spool 4 in the direction of extracting is obstructed via the torsion bar 7, and extraction of the seatbelt is obstructed.

With such a conventional seatbelt retractor 1, a single EA load is set by the torsion bar 7 alone, and the kinetic energy of the passenger is absorbed by only this one EA load. A minimum and constant EA load F1 is selected for this EA load. It is chosen such that the kinetic energy of the passenger can be absorbed, so as to be able to reduce the shock load on the passenger as much as possible.

Even though the kinetic energy of the passenger in an emergency can be absorbed with a conventional EA mechanism made up of only a torsion bar 7, it is desirable that the kinetic energy of the passenger be absorbed in an optimally efficient and more appropriate manner.

SUMMARY OF THE INVENTION

The present invention has been made in light of the need for an EA mechanism which absorbs kinetic energy in a more efficient. It is an object thereof to provide a seatbelt retractor wherein the restriction load placed on the seatbelt can be flexibly set so that the kinetic energy of the passenger is absorbed in a more efficient manner.

The present invention provides a seatbelt retractor comprising at least: a spool for taking up a seatbelt, a lock mechanism having a locking member whereby rotation in the direction of extracting the seatbelt is obstructed in the event of an emergency, a torsion bar rotatably linking the spool and the locking member, and capable of being deformed by twisting, and a seatbelt load restricting mechanism for restricting the load placed upon the seatbelt wherein the torsion bar deforms by twisting at the time that the rotation of the locking member in the direction of the seatbelt being extracted is obstructed and the spool rotates relative to the extracting direction of the seatbelt, wherein the restriction load properties of said seatbelt load restricting mechanism comprise a relatively small restriction load due to twisting deformation of the torsion bar alone, and a relatively great restriction load made up of a restriction load due to twisting deformation of the torsion bar and a restriction load due to another member, and wherein the relatively great restriction load is set to have properties which change in a plurality of steps.

The present invention also provides a seatbelt retractor, wherein the seatbelt load restricting mechanism further comprises a predetermined number of share pins provided between the spool and the locking member such that a shearing load is placed thereupon at the time of the relative rotation of the spool, wherein the restriction load initially greatly increases the shearing load on the share pins and is set to a constant load by the twisting load of the torsion bar following the shearing destruction of the share pins.

The present invention also provides a seatbelt retractor wherein an indented portion is formed in the share pins, and the relative rotation position of the spool is set such that the share pins break under shearing at this indented portion.

Additionally, the present invention provides a seatbelt retractor, wherein a plurality of the share pins are provided, and the relative rotational position of the spool where the share pins break under shearing is set so as to be different for each share pin.

The present invention also provides a seatbelt retractor, wherein the seatbelt load restricting mechanism further comprises a cut portion provided to one of the spool and the locking member, and a cutting blade which is provided to the other of the spool and the locking member and which cuts this cut portion at the time of relative rotation of the spool, wherein said restriction load initially rises greatly due to the cutting resistance at the time of the cutting blade cutting the cut portion but is set at a constant load due to twisting deformation of the torsion bar following completion of cutting of the cut portion.

The present invention provides a seatbelt retractor, wherein a plurality of the cut portions are provided, and wherein a plurality of cutting blades are provided corresponding to these cut portions, and the relative rotation position of the spool where these cut portions are cut by the corresponding cutting blades is set so as to be different for each cut portion.

With the seatbelt retractor according to the present invention thus configured, the restriction load for restriction placed on the seatbelt in the event of an emergency comprises a relatively smaller restriction load and a relatively greater restriction load. The smaller restriction load is due to twisting deformation of the torsion bar while the large restriction load is made up of a restriction load due to twisting deformation of the torsion bar and a restriction load due to twisting deformation of another member. The great restriction load is controlled such that it changes in multiple steps. This is due to the restriction load properties of the seatbelt load restricting mechanism. Thus, effective use of these restriction load properties allows the restriction load to be flexibly adjusted. Accordingly, the kinetic energy of the passenger can be absorbed in an optimally efficient and more appropriate manner.

BRIEF DESCRIPTION OF THE DRAWINGS

FIG. 3(a) through (m) are diagrams illustrating the various forms of the share pins.

FIG. 6 illustrates a fourth example of an embodiment of the present invention, wherein (a) is a longitudinal-section view illustrating the cut portion of the spool, (b) is a cross-sectional view along line VIB—VIB in (a), (c) is a disassembled perspective view illustrating the locking base and the cutting blade, and (d) is a schematic explanation of the cutting of the spool by the cutting blade in this fourth example, schematically illustrated along line VID—VID in (b).

FIG. 7 is a diagram illustrating the EA load properties in the EA mechanism of the fourth example shown in FIG. 6.

DETAILED DESCRIPTION OF THE PREFERRED EMBODIMENTS

The following is a description of embodiments of the present invention with reference to the drawings.

Figure 1A:
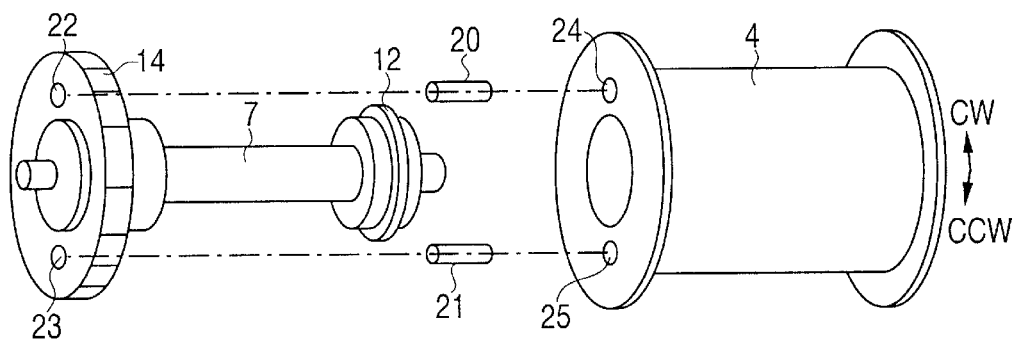
FIG. 1 illustrates a spool, locking base, and share pins, in a first example of an embodiment of the seatbelt retractor according to the present invention, wherein (a) is a disassembled perspective view thereof, and (b) is a cross-sectional view of the assembled state thereof.
Figure 1B:
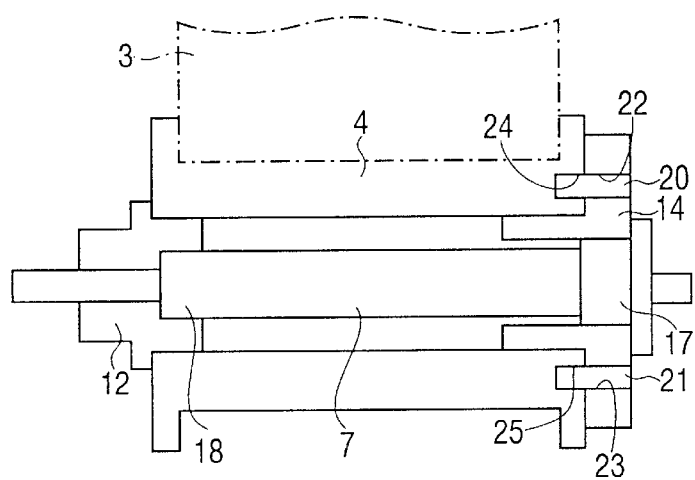

FIG. 1 is a diagram illustrating the spool 4, locking base 14, and share pins 20 and 21, in a first example of an embodiment of the seatbelt retractor according to the present invention. FIG. 1(a) is a disassembled perspective view while FIG. 1(b) is a cross-sectional view of the assembled state. Note that although the spool 4 and the locking base 14 shown in FIG. 1(a) are reversed right and left as compared to the conventional seatbelt retractor 1 shown in FIG. 11, only the relationship of right and left is reversed. The positional relationship between the spool 4 and the locking base 14 is essentially the same as that shown in FIG. 11. As for the description of the examples of the embodiments of the present invention, the components which are the same as the components of the conventional seatbelt retractor 1 are denoted with the same reference numerals, thereby omitting a detailed description thereof. Also, the diagrams omit some of the conventional components of the seatbelt retractor.

As shown in FIGS. 1(a) and 1(b), the EA mechanism in the seatbelt retractor 1 of this first example comprises, in addition to the torsion bar 7, two cylindrical share pins 20 and 21 of the same size, extending in the axial direction. These share pins 20 and 21 are positioned between the spool 4 and the locking base 14, with a predetermined circumferential spacing provided therebetween. Though the example in the drawing shows two share pins 20 and 21 provided, one or more of share pins can be provided. If multiple share pins are provided, the share pins are preferably provided with a predetermined circumferential spacing therebetween.

The share pins 20 and 21 are fit into the locking base side attachment holes 22 and 23. The side attachment holes 22 and 23 penetrate the locking base 14 in the axial direction. Spool side attachment holes 24 and 25 are formed in the spool 4 so as to match with the locking base side attachment holes 22 and 23.

Figure 2A:
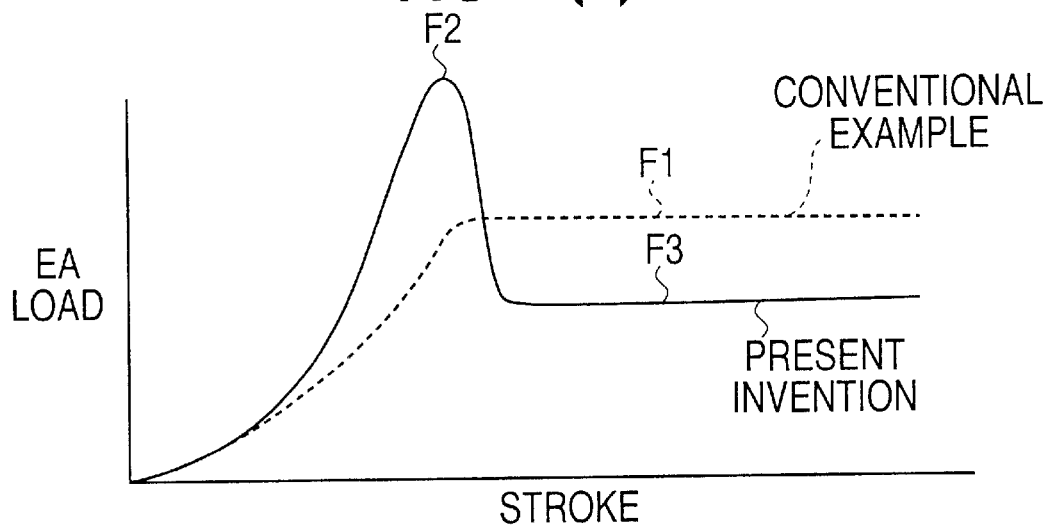
FIG. 2 illustrates the load properties of the EA mechanism of the seatbelt retractor, wherein (a) is a diagram illustrating the load properties of the EA mechanism in the first example shown in FIG. 1 and the load properties of the conventional EA mechanism shown in FIG. 11, and (b) is a diagram illustrating the load properties of the third EA mechanism shown in FIG. 5.

Share pins 20 and 21 are both arranged so as to break when a shearing load of a predetermined shearing destruction load or greater is applied thereto. This increases the EA load of the EA mechanism, by setting the load restricted by the shearing destruction in addition to the restriction load due to the twisting deformation of the torsion bar 7. As illustrated in FIG. 2(a), the shearing destruction load is set such that the EA load due to the EA mechanism is a load F2 greater than the constant load F1 due to the above-described conventional EA mechanism.

Also, the constant load of the EA mechanism restricted by the twisting deformation of the torsion bar 7 according to this first example is set so as to be a load F3 which is smaller than the constant load F1 of the above-described conventional EA mechanism.

With the seatbelt retractor 1 of this first example thus configured, in the event of an emergency, the spool 4 and locking base 14 begin rotating in the direction of extracting of the belt. This is due to the load from the seatbelt 3. The seatbelt 3 is extracted owing to the inertial motion of the passenger, as with the above case of the conventional retractor 1. However, in the case of emergency, the lock means 6 operates so that rotation of the locking base 14 in the extraction direction of the belt is obstructed and enters a locked state. Thus, the spool 4, is also in a temporarily stopped state. However, load in the direction of extracting the belt continues to be applied to the spool 4 from the seatbelt 3. Therefore, the spool 4 attempts to rotate relative to the locking base 14. Then, a shearing load is applied to the share pins 20 and 21 between the spool 4 and locking base 14. This shearing load gradually increases with the relative rotational stroke of the spool 4 to the locking base 14 increases.

In the event that the EA load of the EA mechanism reaches a magnitude exceeding the above-described set shearing destruction load F2, the share pins 20 and 21 both shear. In the subsequent relative rotation stroke of the spool 4, the EA load due to the EA mechanism is a load F3. Load F3 is due only to the twisting load of the torsion bar 7. Thus, in the first embodiment, the load properties of the EA mechanism of this seatbelt retractor 1 occur in two steps. First, the load of the EA mechanism gradually increases (rises) from the load F1 to load F2 with the increase of the stroke of the spool 4. This is indicated by the solid line in FIG. 2(a). Second, following shearing of the share pins 20 and 21, the load peaks at load F2 during the operation of the EA mechanism and decreases (drops) to a constant load F3. Load F3 is smaller than the conventional load F1.

The load properties of such an EA mechanism can be set to various levels with the choice of material and shape of the share pins 20 and 21. Various materials can be used for the share pins 20 and 21. Example materials include metals such as aluminum, iron, steel, and various alloys and the like. Other example materials include resin, synthetic resin (FRP, carbon fiber, etc.) and so forth.

Also, as for the form of the share pins 20 and 21, various forms may be used. FIG. 3 illustrates several example forms. In FIG. 3(*a*), the perimeters of the edge planes of the cylindrical member are rounded. In 3(*b*), the perimeter of the edge planes of the cylindrical member are formed into spherical shapes. The perimeter of the edge planes of the cylindrical member are chamfered in 3(*c*). In 3(*d*), the perimeter of the cylindrical member is curved in a concave form. A cross-sectional half-moon form is shown in 3(*e*). A cross-sectional triangular form (or other cross-sectional polygon form) is shown in 3(*f*). In 3(*g*), the perimeter of the cylindrical member is threaded. A tapered form, wherein the diameters of the edges of the cylindrical member differ, is shown in 3(*h*). In 3(*i*), a groove-shaped indentation 26 is formed on the entire perimeter of the cylindrical member. Additionally, the shape of the indentation 26 may vary. Some examples include the cross-sectional triangular (or square cross-sectional forms) form shown in 3(*j*), the cross-sectional arc-shaped form shown in 3(*k*), the cross-sectional truncated conical trapezoid form shown in 3(*m*), and so forth.

Also, the various load properties of the EA mechanism can be set by the size of the indentation 26 or the depth of the indentation 26. Further, it is not necessarily required to provide the indentation 26 to the entire perimeter of the cylindrical member. The indentation 26 can be provided to a portion thereof, or a plurality of indentations thereof may be provided in the axial direction of the cylindrical member.

Figure 2B:
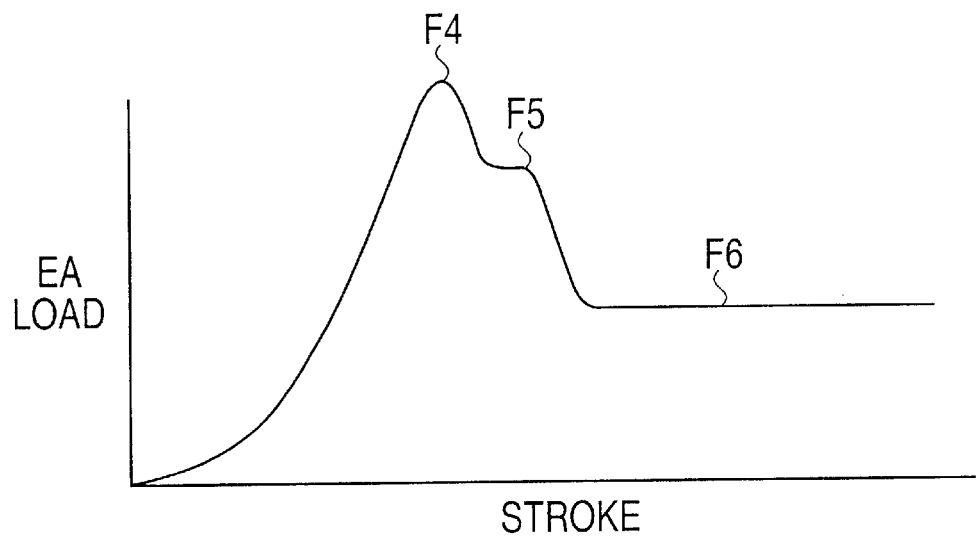
Figure 3A:
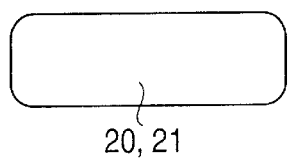
Figure 3B:
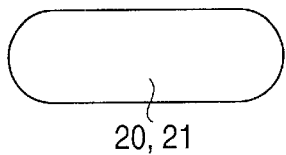
Figure 3C:
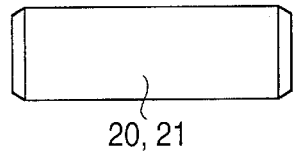
Figure 3D:
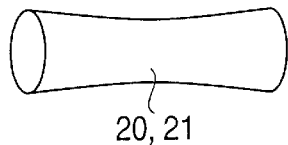
Figure 3E:
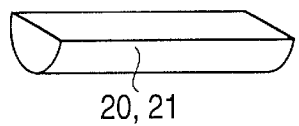
Figure 3F:
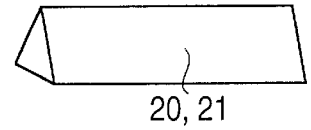
Figure 3G:
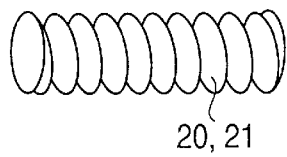
Figure 3H:
Figure 3I:
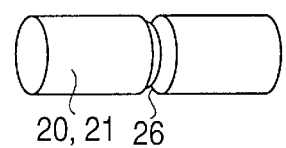
Figure 3J:
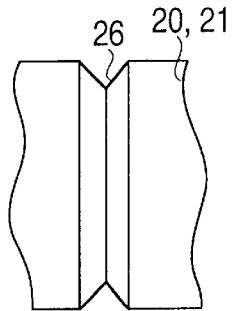
Figure 3K:
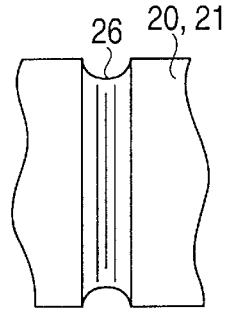
Figure 3M:
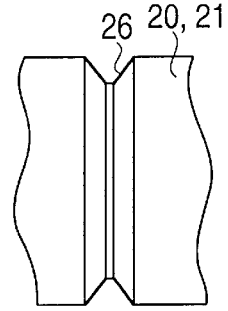
Figure 4A:
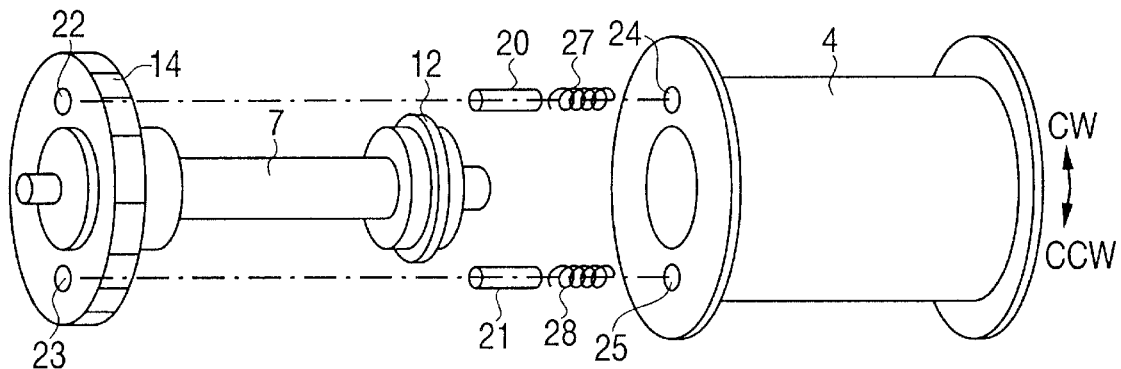
FIG. 4 illustrates a second example of an embodiment of the present invention, wherein (a) is a disassembled perspective view the same as FIG. 1(a), (b) is a partial cross-sectional view illustrating the state partway through assembling the share pins, (c) is a partial cross-sectional view illustrating the assembled state of the share pins, and (d) is a partial cross-sectional view illustrating a variation of this second example.
Figure 4B:
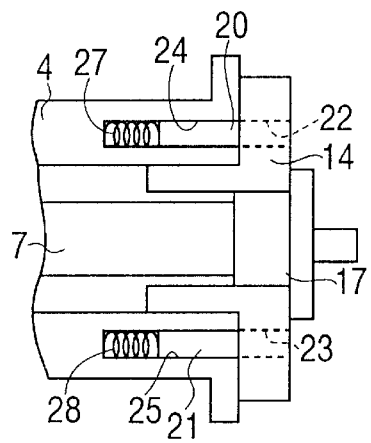
Figure 4C:
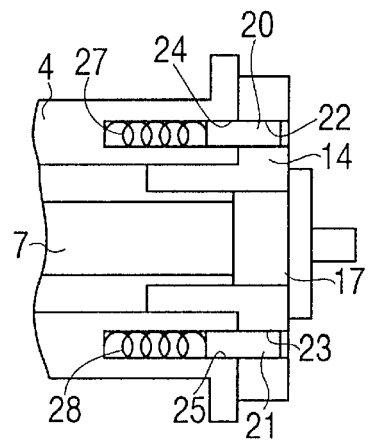
Figure 4D:
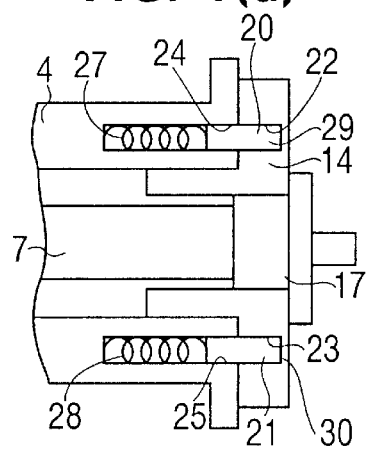

By using various materials and various forms for the share pins, a wide variety of load properties for the mechanism can be easily set. For example, FIG. 2(*b*) illustrates an example in which the restriction loads F4 and F5, due to share pins 20 and 21, are greater than the restriction load F3, which is due to the twisting load of the torsion bar 7 alone. The levels of the restriction load due to the share pins 20 and 21 are set so as to change in two steps, F4 and F5. That is, the load properties of the mechanism are set to operate in three steps. Thus, the load of the seatbelt 3 can be restricted in a fine manner.

The seatbelt retractor 1 of this first example has a restriction load that can be flexibly and variably adjusted by using the three-step restriction load properties of the EA mechanism. Accordingly, the kinetic energy of the passenger can be absorbed in an optimally efficient and more appropriate manner.

The embodiments above are merely examples. Other configurations, other operations, and other advantages of the seatbelt retractor 1 of the first example may occur to one of ordinary skill in the art without departing from the spirit and scope of the invention.

FIG. 4 illustrates a second example of an embodiment of the present invention. FIG. 4(*a*) is a disassembled perspective view, 4(*b*) is a partial cross-sectional view illustrating the state partway through assembling the share pins, 4(*c*) is a partial cross-sectional view illustrating the assembled state of the share pins, and 4(*d*) is a partial cross-sectional view illustrating a variation of the second example.

As shown in FIG. 4(*a*), the seatbelt retractor 1, according to this second example, has springs 27 and 28 for pressing the share pins 20 and 21, respectively. These springs 27 and 28 are set so as to be at their extended free length, i.e., such that the pressing force for pressing the share pins 20 and 21 is zero. In this state, the share pins 20 and 21 are set at predetermined positions between the spool 4 and the locking base 14

In this second example, in order to set the share pins 20 and 21 at the predetermined positions between the spool 4 and the locking base 14, the springs 27 and 28 are inserted in the spool side assembly holes 24 and 25 of the spool 4. This is shown in FIG. 4(*b*). Then the share pins 20 and 21 are inserted. In this state, the share pins 20 and 21 are projecting approximately halfway from the edge plane of the spool 4. This is due to the spring force of the springs 27 and 28. Next, as shown in (b) of the same figure, the left side axial portion of the locking base 14 is attached to the spool 4 so as to allow relative rotation. At this time, the locking base 14 is attached to the spool 4 without matching the positions of the locking base side assembly holes 22 and 23 of the locking base 14 to the spool side assembly holes 24 and 25. Then, the share pins 20 and 21 are each pressed into the spool side assembly holes 24 and 25 of the spool 4 by the locking base 14 such that the springs 27 and 28 are each compressed. In this state, the share pins 20 and 21 are pressed by the spring force of the springs 27 and 28 in the direction of being pressed out of the spool side assembly holes 24 and 25.

In the event that the locking base 14 is rotated relative to the spool 4, and the locking base side assembly holes 22 and 23 of the locking base 14 match the spool side assembly holes 24 and 25 of the spool 4, the share pins 20 and 21 are pressed by the spring force of the springs 27 and 28 out of the spool side assembly holes 24 and 25, and introduced into the locking base side assembly holes 22 and 23 of the locking base 14. Then, as shown in 4(*c*), at the point that the share pins 20 and 21 reach a predetermined position traversing the spool 4 and locking base 14, the springs 27 and 28 stretch out and reach their free length. At this position, the share pins 20 and 21 are no longer pressed by the springs 27 and 28, thereby completing the setting thereof.

Thus, the seatbelt retractor 1 of the second example, with regard to assembling the locking base 14 and share pins 20 and 21 to the spool 4, can be easily assembled to the spool 4. This is accomplished by simply rotating the locking base 14 after fitting thereof to the spool 4, without taking the trouble of matching the position of the locking base side assembly holes 22 and 23 to the spool side assembly holes 24 and 25 at the time of assembling the locking base 14 to the spool 4.

The first and second examples described above have the locking base side assembly holes 22 and 23 formed as through holes. However, arrangements may be made wherein the locking base side assembly holes 22 and 23 are not through holes. This is shown in 4(*d*). The holes 22 and 23 have bottoms formed of walls 29 and 30. Forming walls 20 and 30 thus, allows means for preventing the share pins 20 and 21 from falling out with regard to the locking base side assembly holes 22 and 23. In this case, in the second embodiment, the share pins 20 and 21 are pressed by the springs 27 and 28. Thus the share pins 20 and 21 can be more effectively prevented from falling out.

FIG. 5 illustrates a third example of an embodiment of the present invention. FIG. 5(*a*) is a diagram schematically illustrating the state of one share pin before shearing as viewed from the locking base side while FIG. 5(*b*) is a diagram schematically illustrating the state of one share pin after shearing and two share pins before shearing.

In the above examples, the two share pins 20 and 21 are both fabricated to be the same size and undergo shearing destruction simultaneously. However, with the seatbelt retractor 1 according to the third example, the two share pins 20 and 21 are formed with different sizes and such that shearing occurs at different timing.

Figure 5A:
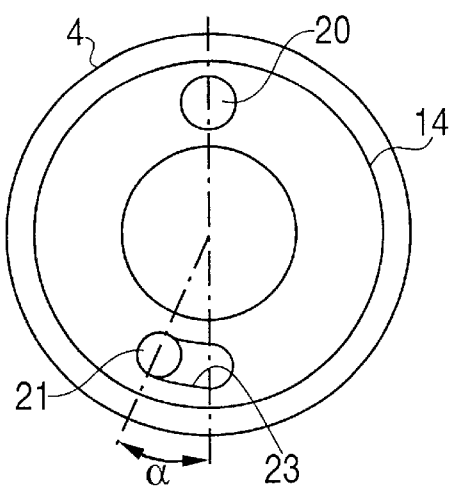
FIG. 5 illustrates a third example of an embodiment of the present invention, wherein (a) is a diagram schematically illustrating the state of one share pin before shearing as viewed from the locking base side, (b) is a diagram schematically illustrating the state of one share pin after shearing and two share pins before shearing, in the same manner as with (a).
Figure 5B:
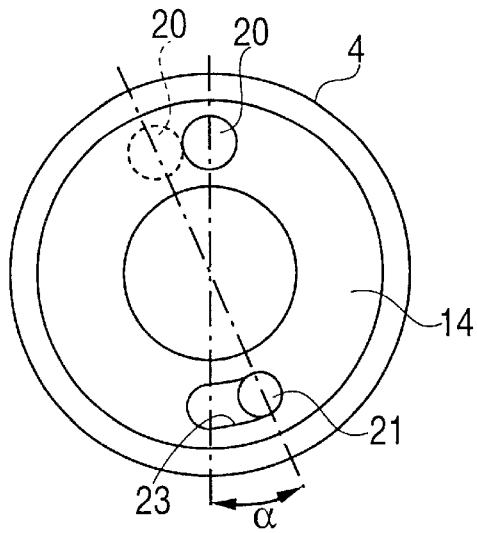

That is, as shown in FIG. 5(a), the two share pins 20 and 21 are formed such that one share pin 20 has a greater diameter, and the other share pin 21 has a smaller diameter. Also, the locking base side assembly hole 23 to which the other share pin 21 is assembled is formed as an arc-shaped slot along a circle of which the center is the rotating axis of the spool 4 and locking base 14. In this case, the slot-shaped locking base side assembly hole 23 is set relative to the other share pin 21 assembled to the spool 4 such that the locking base 14 is capable of relative rotation by a rotational angle a.

The set shearing load of the first share pin 20 is set so that the EA load of the EA mechanism is a load F4 which is greater than the constant load F1 of the conventional EA mechanism. Also, the set shearing load of the second share pin 21 is set such that the EA load of the EA mechanism is a load F5 which is smaller than the load F4. Further, the constant EA load of the EA mechanism, which is restricted by the twisting deforming of the torsion bar 7 in this third example, is set so as to be a load F6 which is smaller than the constant load F1 of the conventional EA mechanism.

With the seatbelt retractor 1 of the third example, when the rotation of the locking base 14 is locked by operation of the lock means 6 in the event of an emergency, the first share pin. 20 receives the shearing load from the load applied to the spool 4 from the seatbelt 3. At this time, the second share pin 21 is at one end of the slot-shaped locking base side assembly hole 23 and, thus, is free as to the locking base 14. It therefore does not receive the shearing load.

At the point that the shearing load applied to the shearing pin 20 reaches a magnitude wherein the EA load of the EA mechanism exceeds the set shearing load F4, the share pin 20 undergoes shearing. Subsequently, the spool 4 rotates relative to the locking base 14 in the direction of extracting the belt. When the relative rotation of the spool 4 reaches the rotation angle α, the second share pin 21 comes into contact with the other end of the locking base side assembly hole 23. Thus, the share pin 21 is subjected to a shearing load. At the point that the shearing load applied to the shearing pin 21 reaches a magnitude wherein the EA load of the EA mechanism exceeds the set shearing destruction load F5, the share pin 21 undergoes shearing, and spool 4 again rotates relative to the locking base 14 in the direction of extracting the belt.

In the subsequent relative rotational stroke of the spool 4, the EA load of the EA mechanism is a load F6 consisting only of the twisting load of the torsion bar 7. Thus, in the third embodiment, the load properties of the EA mechanism for the seatbelt retractor 1 occur in three steps. First the properties of the load of the EA mechanism gradually increase to the load F4 with the increase of the stroke of the spool 4. This is shown by the solid line in FIG. 2(b). Second, the load decreases until a shearing load is applied to the second share pin 21 following shearing of the first share pin 20. The load further becomes a load F5 following the application of the shearing load to the second share pin 21. This is due to the shearing load of the second share pin 21 and the twisting load of the torsion bar 7. The load is reduced to the small constant load F6 following shearing destruction of the other share pin 21.

Thus, with the seatbelt retractor 1 according to the third example, a restriction load which is greater than the restriction load F3 due to the twisting load of the torsion bar 7 alone is set due to the share pins 20 and 21. The restriction load due to the share pins 20 and 21 changes properties in two steps, i.e., the load properties of the EA mechanism has three-step properties, so the load of the seatbelt 3 can be restricted in a fine manner.

Also, an arrangement may be made wherein three or more share ping are provided. The size of each share pin is chosen appropriately to variably change the set shearing load. The size is also chosen to vary the timing to which the shearing load is applied to each share pin (i.e., variously changing the aforementioned rotational angle a for each share pin). Thereby the load properties for the EA mechanism can be obtained with multiple steps and varying peak values.

Figure 5C:
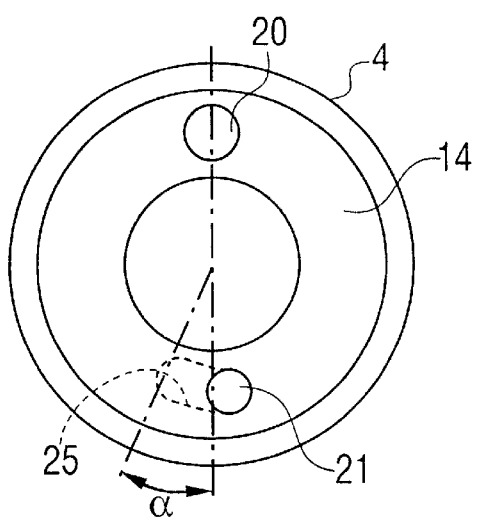
Figure 5D:
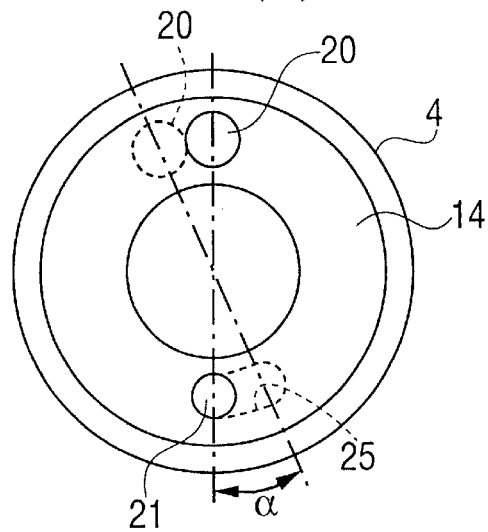

Also, an arrangement may be made wherein the spool side assembly hole 25 is formed as an arc-shaped slot, instead of making the locking base side assembly hole 23 formed as an arc-shaped slot as shown in FIG. 5(c) and (d).

FIG. 6 illustrates a fourth example of an embodiment of the present invention. FIG. 6(a) is a longitudinal-section view illustrating the cut portion of the spool, 6(b) is a cross-sectional view along line VIB—VIB in 6(a), 6(c) is a disassembled perspective view illustrating the locking base and the cutting blade, and 6(d) is a schematic explanation of the cutting of the spool by the cutting blade in this fourth example, schematically illustrated from the direction VID in 6(b).

With the first through third examples, the load of the EA mechanism is greater than the loads F3 and F6 due to the twisting load of the torsion bar 7, by the shearing load of the share pins. However, with this fourth example, the seatbelt retractor 1 does not use share pins, but rather uses the cutting resistance of cutting blades cutting the edge surface 4a of the spool 4 facing the locking base 14. Thus, the load of the EA mechanism is greater than the loads F3 and F6 due to the twisting load of the torsion bar 7.

That is to say, as shown in FIG. 6(a) and 6(b), with this fourth example, three cut portions 31, 32, and 33 are provided at the edge surface 4a of the spool 4 facing the locking base 14. These cut portions 31, 32, and 33 are positioned at equal intervals on the perimeter of a single circle having the rotational axis of the spool 4 as the center thereof. They are set at the same predetermined length in the circumferential direction. Provided on the perimeter of the single circle upon which the cut portions 31, 32, and 33 are provided, and between the cut portions 31, 32, and 33, are three arc-shaped recessions 34, 35, and 36. The recessions 34, 35, and 36 are formed such that the blade tips of later-described cutting blades can enter therein.

On the other hand, as shown in FIG. 6(c), three cutting blade supporting holes 37, 38, and 39 are formed at positions on the locking base 14 facing the recessions 34, 35, and 36 on the spool 4, when the locking base 14 is assembled to the spool 4. Cutting blades 40, 41, and 42 are fit into and supported by the cutting blade supporting holes 37, 38, and 39. Then, as shown in FIG. 6(d), when the locking base 14 is being assembled to the spool 4, the blade tip 40a of the cutting blade 40 intrudes into the recession 34. The blade tip faces in the direction of the relative rotation of the spool 4, in the direction of extracting the belt. It is in contact with the side wall plane of the cut portion 31, orthogonal with the circumferential direction. Also, a let out portion 43, which allows shavings from the cutting blade 40 to escape, is formed on the supporting portion of the cutting blade 40 on the locking base 14. The same holds for the other cutting blades 41 and 42.

With the seatbelt retractor 1 of the fourth example thus configured, when that the rotation of the locking base 14 is locked by operation of the lock means 6 in the event of emergency, the spool 4 rotates relative to the locking base 14 under the load applied to the spool 4 from the seatbelt 3. Then, as shown in FIG. 6(d), the cutting blades 40, 41, and 42 supported by the locking base 14 each cut the cut portions 31, 32, and 33 provided at the edge surface 4a of the spool 4. The shavings of the cut portions 31, 32, and 33 cut by the cutting blades 40, 41, and 42 escape into the corresponding let out portions on the locking base 14 (e.g., the let out portion 43 corresponding to the cutting blade 40), so that cutting proceeds smoothly.

Thus, the spool 4 strokes (rotates) relative to the locking base 14 while being cut. This means that, at this time, the spool 4 rotates while sensing the cutting resistance due to cutting. The EA load of the EA mechanism becomes greater than the constant EA load due only to the twisting load of the torsion bar 7. This is due to the load from the cutting resistance being added to the load due to the twisting deformation of the torsion bar 7. At the point that the cutting of the cut portions 31, 32, and 33 is completed, the load due to cutting resistance is no more. Thus the EA load decreases from the peak load P7. Then, in the subsequent rotation of the spool 4, the EA load of the EA mechanism has a constant load F8 due only to the twisting of the torsion bar 7. Accordingly, the load properties of the EA mechanism of the seatbelt retractor 1 of this fourth example have two-step properties. The EA load gradually increases to the load F7 with the increase in the rotation of the spool 4, as shown in FIG. 7, and decreases to the constant load F8 at the point that the cutting of the cut portions 31, 32, and 33 is completed.

Figure 8:
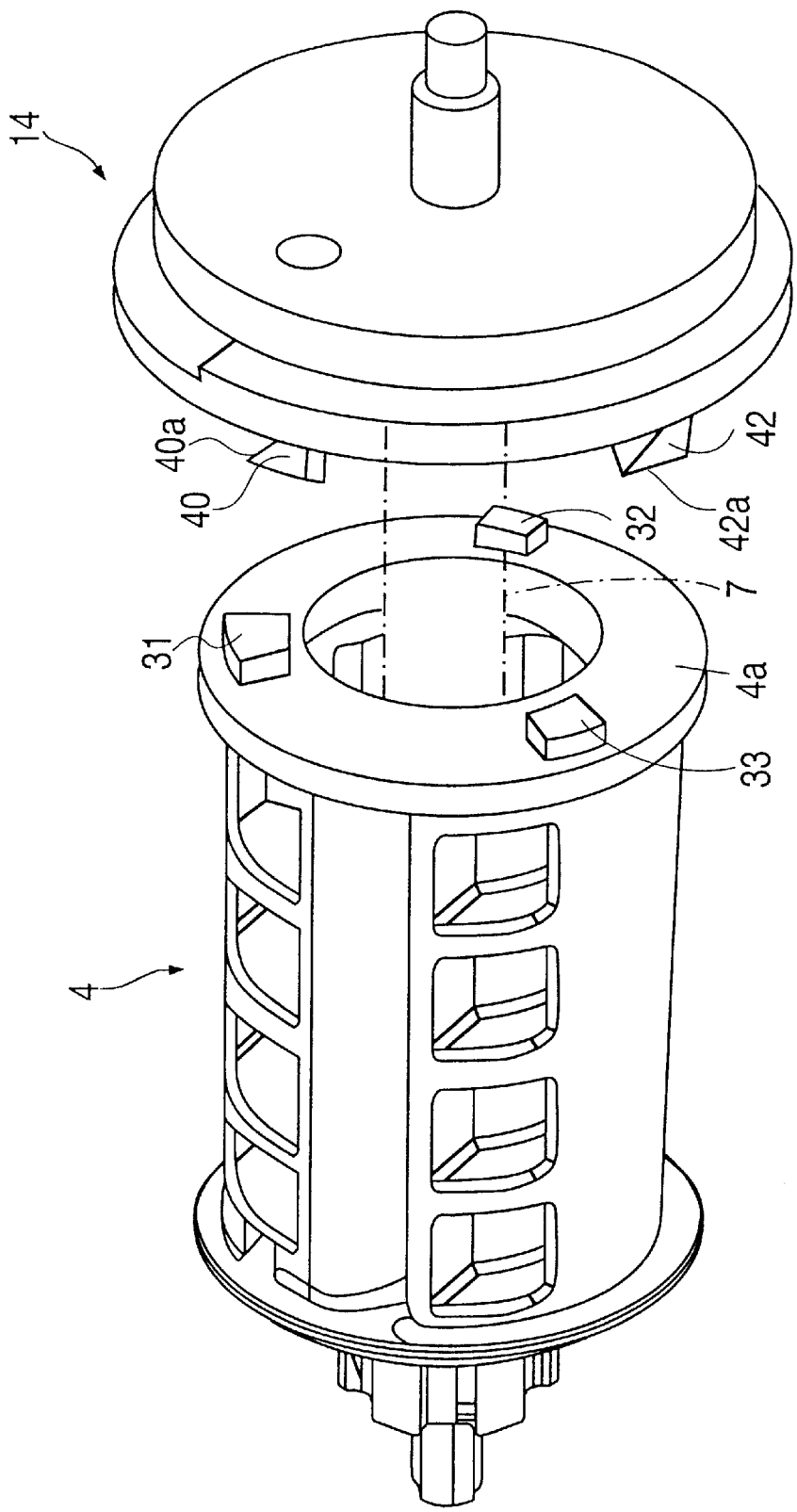
FIG. 8 is a disassembled perspective view illustrating the spool and locking base in the fifth example of an embodiment of the present invention.

Other configurations, other operations, and other advantages of the seatbelt retractor 1 of the fourth example are essentially the same as those of the first through third examples. FIG. 8 is a disassembled perspective view in the same manner as FIG. 1(a), illustrating the spool and locking base in a fifth example of an embodiment according to the present invention.

Figure 9A:
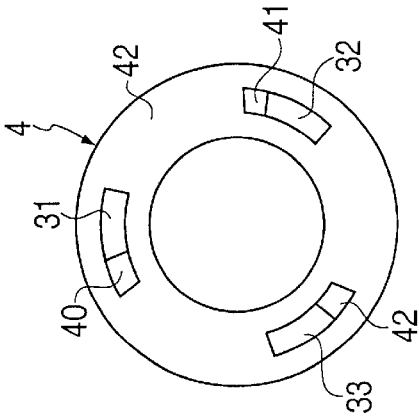
FIG. 9 schematically illustrates the cut portions and cutting blades in each of the examples, wherein (a) is a diagram schematically illustrating the placement positions of the cut portions and the positional relation of the cutting blades to the cut portions according to the fifth example, (b) is a diagram the same as (a) illustrating a sixth example of an embodiment of the present invention, (c) is a diagram the same as (a) illustrating a seventh example of an embodiment of the present invention, (d) is a diagram the same as (a) illustrating an eighth example of an embodiment of the present invention, (e) is a diagram illustrating the dimensions of the cut portions and the cutting blades, and (f) is also a diagram illustrating the dimensions of the other portions of the cut portions and the cutting blades.

As shown in FIG. 8, the seatbelt retractor 1 according to this fifth example has three arc-shaped cut portions 31, 32, and 33 at the edge surface 4a of the spool 4 facing the locking base 14. The arc-shaped cut portions protrude toward the locking base 14. As shown in FIG. 9(a), these cut portions 31, 32, and 33 are positioned at equal intervals in the circumferential direction, with the same arc length, the same width (length in the diameter direction), and the same height (amount of protrusion in the axial direction).

Further, as shown in FIG. 9(a), the three cutting blades 40, 41, and 42 provided on the locking base 14 each correspond to the cut portions 31, 32, and 33 on the spool 4. They are positioned on the same rotational radius and, in a normal state, the blade tips 40a, 41a, and 42a thereof are in contact with one end of the corresponding cut portions 31, 32, and 33 in the circumference direction. The EA mechanism of this fifth example comprises of the torsion bar 7, cut portions 31, 32, and 33, and cutting blades 40, 41, and 42.

With the EA mechanism of the fifth example, in the event of relative rotation of the spool 4 in the direction of extracting the seatbelt, as with the above-described fourth example, these cutting blades 40, 41, and 42 cut the corresponding cut portions 31, 32, and 33. A load is applied to the spool 4 as to the relative rotation in the direction of extracting the seatbelt, due to the cutting resistance from this cutting.

Figure 10A:
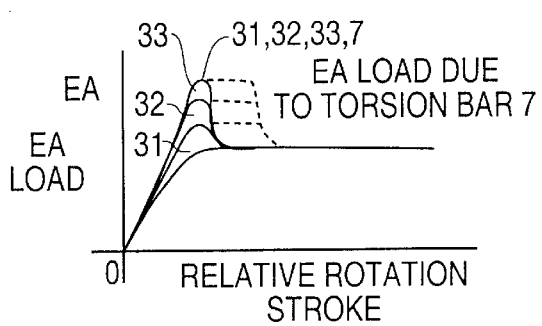
FIG. 10 illustrates the EA load properties of the examples, wherein (a) is a diagram illustrating the EA load properties of the fifth example with a solid line and illustrating the EA load properties of the seventh example with a dotted line, (b) is a diagram illustrating the EA load properties of the eighth example, (c) is a diagram illustrating the EA load properties of the ninth example of an embodiment of the present invention, (d) is a diagram illustrating the relationship between the dimensions of the cut portions and the cutting blades, and the cutting resistance, and (e) is a diagram illustrating the EA load properties of the tenth example of an embodiment of the present invention.
Figure 10B:
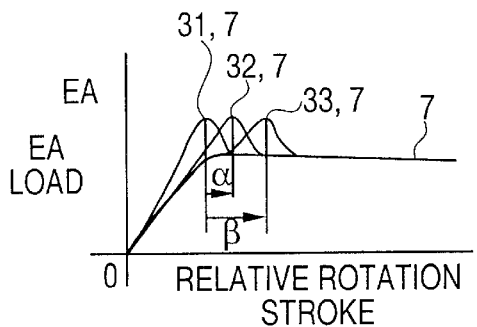
Figure 10C:
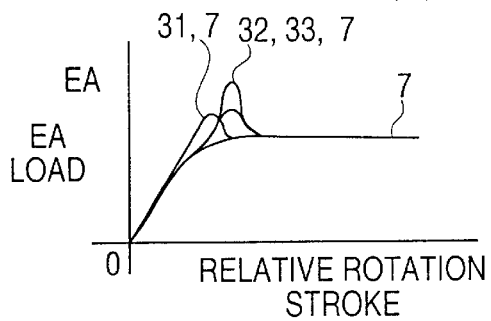
Figure 10D:
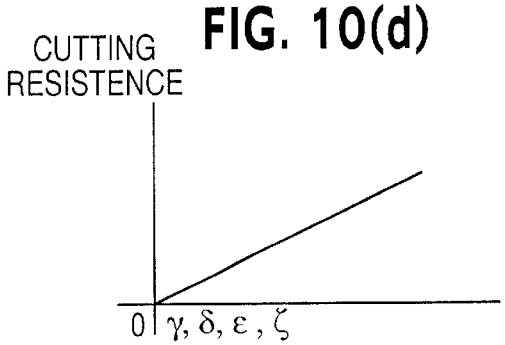

Thus, as shown in FIG. 10(a), the EA load properties of the EA mechanism are set to an EA load greater than the set load of the torsion bar 7 while the spool 4 performs relative rotation (relative rotating stroke). Following which, at the point that the cutting of the cut portions 31, 32, and 33, by the cutting blades 40, 41, and 42, the EA load properties are set to the constant load of the torsion bar 7. Accordingly, the EA load properties are the same as in the fourth example shown in FIG. 7.

Figure 11:
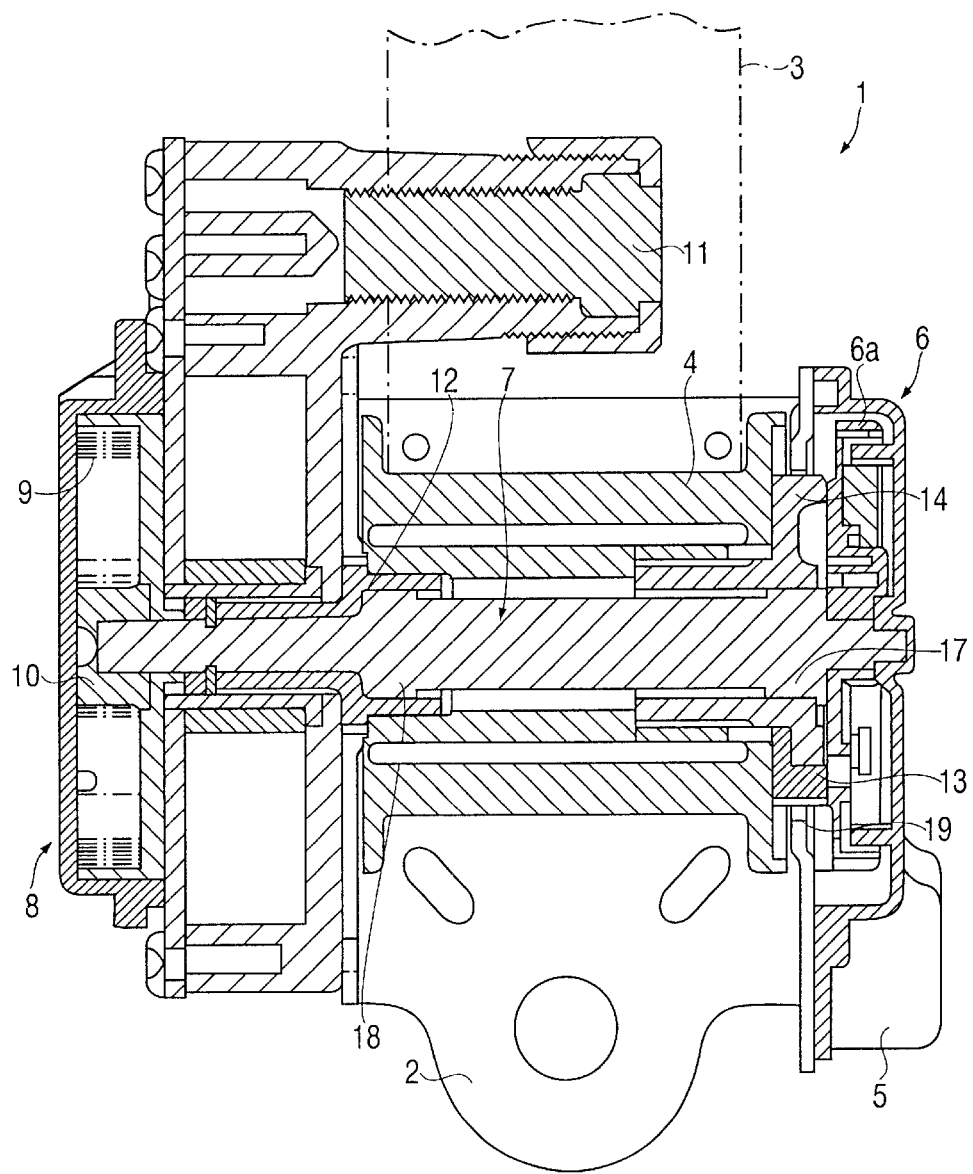
FIG. 11 is a longitudinal-section diagram illustrating an example of a conventional seatbelt retractor provided with a torsion bar.

Other configurations and other operations of the seatbelt retractor 1 according to the fifth example are the same as those of the fourth example shown in FIG. 6 and the conventional example shown in FIG. 11.

Thus, with the seatbelt retractor 1 according to this fifth example, the EA load is set to a large value from the start of operation through the predetermined relative rotation stroke of the spool 4, and is adjusted to a smaller constant value during subsequent relative rotation stroke of the spool 4.

Other advantages of the seatbelt retractor 1 according to this fifth example are the same as those of the fourth example shown in FIG. 6 and the conventional example shown in FIG. 11.

Figure 9B:
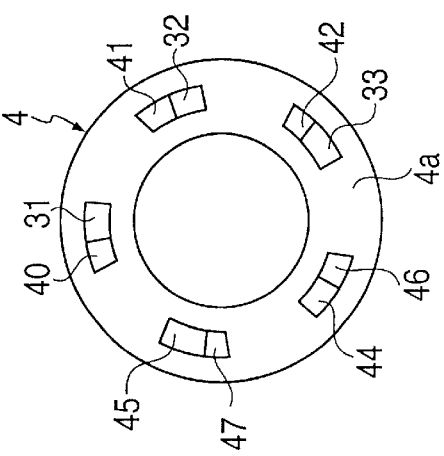

FIG. 9(b) illustrates a sixth example of an embodiment of the present invention. With the above fifth example, three cut portions 31, 32, and 33, and three cutting blades 40, 41, and 42 corresponding to the cut portions 31, 32, and 33 are provided. However, with the seatbelt retractor 1 of this sixth example, five cut portions 31, 32, 33, 44, and 45, and five cutting blades 40, 41, 42, 46, and 47 corresponding to the cut portions 31, 32, 33, 44, and 45 are provided, in the same manner as with FIG. 9(a).

With the seatbelt retractor 1 according to this sixth example, the EA load is set to a large value from the start of operation through the predetermined relative rotation stroke of the spool 4. It is adjusted to a smaller constant value which is equal to the set load of the torsion bar during the subsequent relative rotation stroke of the spool 4, as with the fifth example. However, at this time, with the EA load properties according to this sixth example, the large set value from the start of operation through the predetermined relative rotation stroke of the spool 4 (i.e., the maximum EA load) is greater than that in the fifth example.

Other configurations, other operations, and other advantages of the seatbelt retractor 1 of the sixth example are the same as those of the seatbelt retractor 1 according to the fifth example.

Figure 9C:
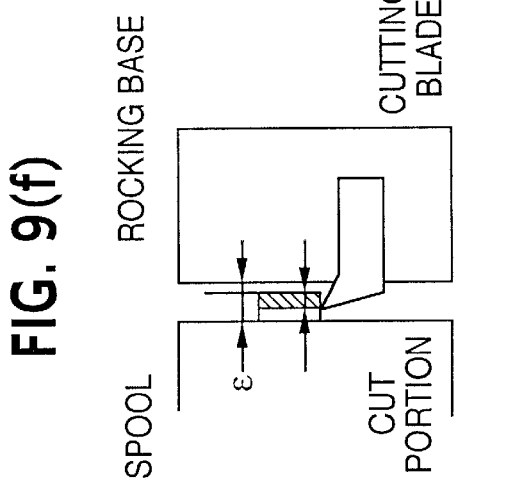
Figure 9D:
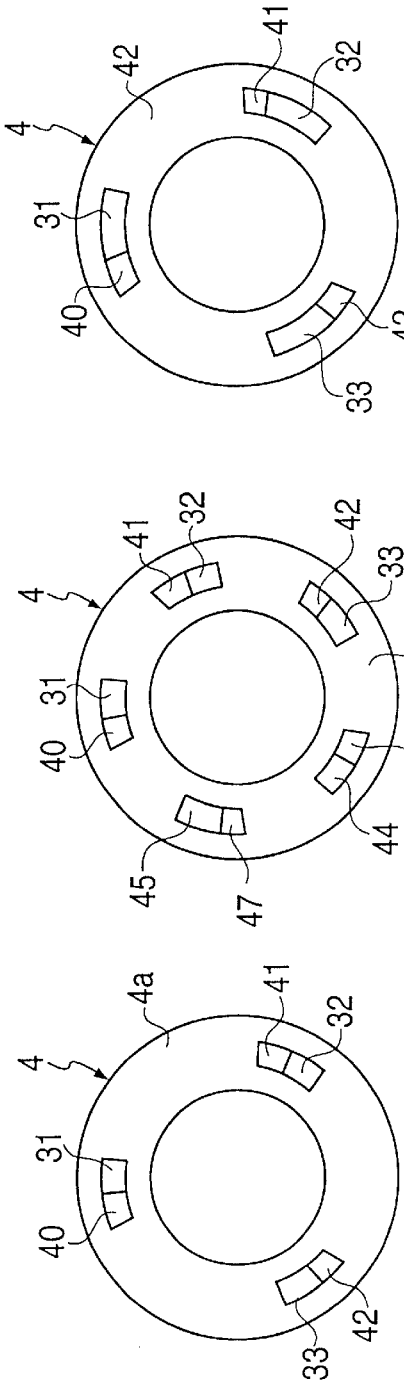
Figure 9E:
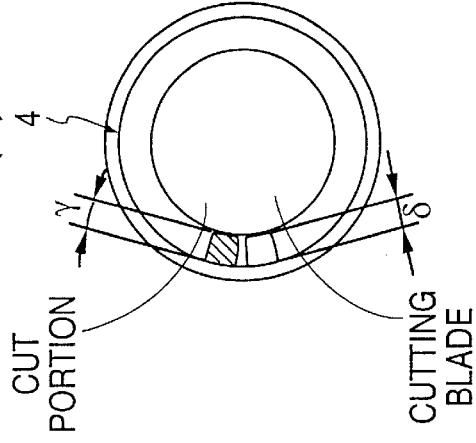
Figure 9F:
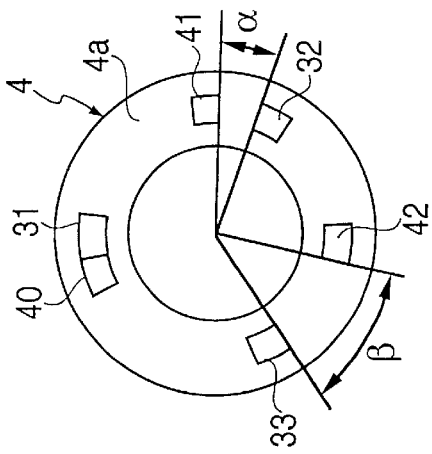

FIG. 9(c) illustrates a seventh example of an embodiment of the present invention. With the seatbelt retractor 1 of this seventh example, three cut portions 31, 32, and 33 and three cutting blades 40, 41, and 42 corresponding to the cut portions 31, 32, and 33 are provided, in the same manner as with the fifth example. However, in this case, as with the seatbelt retractor 1 of the seventh example, the arc-shaped lengths of the three cut portions 31, 32, and 33 are longer than those in the case of the fifth example.

With the seatbelt retractor 1 according to this seventh example, as with the case of the fifth example, the EA load is set to a large value from the start of operation through a predetermined relative rotation stroke of the spool 4, and is adjusted to a smaller constant value. The smaller constant value is equal to the set value of the torsion bar during subsequent relative rotation stroke of the spool 4. However, at this time, with the EA load properties according to this seventh example, the area of the large value set from the start of operation is longer. In other words, the EA load properties of this seventh example are such that, as shown by the dotted lines in FIG. 10(a), the predetermined relative rotation stroke of the spool is longer than that in the case of the sixth example.

Other configurations, other operations, and other advantages of the seatbelt retractor 1 of the seventh example are the same as those of the seatbelt retractor 1 according to the fifth example.

FIG. 9(*d*) illustrates an eighth example of an embodiment of the present invention. With the seatbelt retractor of the above fifth example, the blade tips 40*a*, 41*a*, and 42*a* of the cutting blades 40, 41, and 42 in a normal state thereof are in contact with one end of the corresponding cut portions 31, 32, and 33 in the circumference direction. However, with the seatbelt retractor 1 according to this eighth example, in a normal state, the blade tip 40*a* of one cutting blade 40 is in contact with one end of the corresponding cut portion 31 in the circumference direction. The blade tip 41a of another cutting blade 41 is distanced from one end of the corresponding cut portion 32 in the circumference direction by a predetermined spacing a in the rotational direction. Further, the blade tip 42*a* of the remaining cutting blade 42 is distanced from one end of the corresponding cut portion 33 in the circumference direction by a predetermined spacing β in the rotational direction. Spacing β is greater than the spacing α.

With the EA mechanism of the eighth example, in the event of relative rotation of the spool 4 in the direction of extracting the seatbelt, the cutting blade 40 first cuts the corresponding cut portion 31. At the point that the cutting thereof is almost completed, and the relative rotation stroke of the spool 4 reaches the predetermined spacing α, the cutting blade 41 next comes into contact with one end of the corresponding cut portion 32 in the circumferential direction. Further relative rotation of the spool causes the cutting blade 41 to cut the cut portion 32. At the point that the cutting thereof is almost completed and the relative rotation stroke of the spool 4 reaches the predetermined spacing β, the cutting blade 42 next comes into contact with one end of the corresponding cut portion 33 and further relative rotation of the spool 4 causes the cutting blade 42 to cut the cut portion 33. At the point that the cutting of the last cut portion 33 is completed, the cutting of the cut portions 31, 32, and 33 by the cutting blades 40, 41, and 42 is all completed, so the EA load is set to the constant set load of the torsion bar 7.

Thus, with the EA mechanism of this eighth example, the three cut portions 31, 32, and 33 are sequentially cut. As shown in FIG. 10(*b*), the EA load, is such that the predetermined relative rotational stroke of the spool 4 until reaching the small constant value of the set load of the torsion bar is approximately slightly under three times that in the fifth embodiment.

Other configurations, other operations, and other advantages of the seatbelt retractor 1 of the eighth example are the same as those of the seatbelt retractor 1 according to the fifth example. Note that the invention based on this eighth example is not restricted to three cutting portions 31, 32, and 33. Rather, an arbitrary number of four or more cutting portions may be provided, and further, the predetermined spacing between the blade tips of the cutting blades and one end of the cut portions in the circumferential direction can be set to sequentially increase.

FIG. 10(*c*) illustrates the EA load properties of the EA mechanism according to a ninth example of an embodiment of the present invention. As with the above eighth example, the predetermined spacings a and a between the blade tips 40*a*, 41*a*, and 42*a* corresponding to the one end of the cut portions 31, 32, and 33 increase sequentially, but with this ninth example, the predetermined spacings a and D are made to be mutually equal (α=β).

With the EA mechanism of the ninth example, in the event of relative rotation of the spool 4 in the direction of extracting the seatbelt, the cutting blade 40 first cuts the corresponding cut portion 31. At the point that the cutting thereof is almost completed and the relative rotation stroke of the spool 4 as to the locking base 14 reaches the predetermined spacing α (=β), the two cutting blades 41 and 42 come into contact with one end of the corresponding cut portions 32 and 33 in the circumferential direction. Further relative rotation of the spool 4 as to the locking base 14 causes the cutting blades 41 and 42 to cut the cut portions 32 and 33. Then, at the point that the cutting of the cut portions 32 and 33 are complete, the cutting of the cut portions 31, 32, and 33 by the cutting blades 40, 41, and 42 is all completed. Thus, the EA load is set to the constant set load due to the torsion bar 7.

Thus, with the EA mechanism of this ninth example, the cut portions 31 is first cut, and then the two cut portions 32 and 33 are simultaneously cut. As shown in FIG. 10(*c*), the EA load properties thereof are such that the predetermined relative rotational stroke of the spool 4 until reaching the small constant value which is the set load is approximately slightly under ⅔ times the set load of the torsion bar 7. However, the maximum EA load is greater than that in the eighth example.

Other configurations, other operations, and other advantages of the seatbelt retractor 1 of the ninth example are the same as those of the seatbelt retractor 1 according to the eighth example.

Note that the invention based on this ninth example is not restricted to three cutting portions 31, 32, and 33. Rather, an arbitrary number of four or more may be provided. Further, an arrangement may be made wherein the predetermined spacing at a portion between the blade tips of the cutting blades and one end of the cut portions in the circumferential direction is be set to be equal. In addition, the predetermined spacing at other portions between the blade tips of the cutting blades and one end of the cut portions in the circumferential direction is be set to be greater than the above portion but mutually equal.

The dimensions of the cut portions, the dimensions of the cutting blades, the cutting depth, and the cutting resistance are in a proportional relation. That is, the width γ of the cutting portion and the width δ of the cutting blade shown in FIG. 9(*e*), the thickness ε of the cut portion and the cutting depth ζ shown in FIG. 9(*f*) and the cutting resistance are in a proportional relationship shown in FIG. 10(*d*). In the event that these values γ, δ, ε, and ζ increase, the cutting resistance also linearly increases. Accordingly, setting the values of γ, δ, ε, and ζ appropriately allows the cutting resistance, i.e., the EA load to be adjusted to various values.

Then, appropriately combining the EA load properties shown in the above FIGS. 10(*a*) through 10(*c*) and the cutting resistance properties shown in 10(*d*) allows various EA load properties to be set.

FIG. 10(*e*) illustrates the EA load properties of the EA mechanism according to a tenth example of an embodiment of the present invention. This tenth example is an EA mechanism wherein the EA mechanism shown in FIG. 9(*d*) has been partly changed, in that the predetermined spacing α is set to zero (i.e., in a normal state the blade tip 41*a* of the cutting blade 41 is in contact with one end of the cut portion 32 in the circumferential direction). Also, the length of the cut portion 31 in the circumferential direction is made longer than the length of the cut portion 32, as a cut portion shown in FIG. 9(*c*), wherein the length in the circumference direction is long. In this case, the length of the cut portion 31 in the circumferential direction is set to a magnitude wherein cutting of this cut portion 31 is performed even following the cutting of the last cut portion 33, by a predetermined relative rotational stroke of the spool 4. Further, appropriately setting the values of γ, 67, ε, and ζ, shown in FIG. 9(e) and 9(f) for the cut portion 33 and the cutting blade 42, allows the maximum EA load to be set greater than the maximum EA load due to the cut portion 32.

With the EA mechanism of the tenth example, in the event of relative rotation of the spool 4 in the direction of extracting the seatbelt, the cutting blades 40 and 24 first cut the corresponding cut portions 31 and 32. At the point that the cutting of the cut portion 32 is almost completed and the relative rotation stroke of the spool reaches the predetermined spacing β, the remaining cutting blade 42 next comes into contact with one end of the corresponding cut portion 33. Further, relative rotation of the spool 4 as to the locking base 14 causes the cutting blade 42 to cut the cut portion 33. In this case, the cutting of the cutting portion 32 is completed, but the cutting of the cut portion 31 is still being carried out. Also, the maximum EA load due to the cut portion 33 is greater than the maximum EA load due to the cut portion 32.

Even after the cutting of the cutting portion 33 is completed, the cutting of the cut portion 31 is still being carried out. At the point that the cutting of this cut portion 31 is completed, the cutting of the cut portions 31, 32, and 33 by the cutting blades 40, 41, and 42 is all completed, so the EA load is set to the constant set load of the torsion bar 7.

Figure 10E:
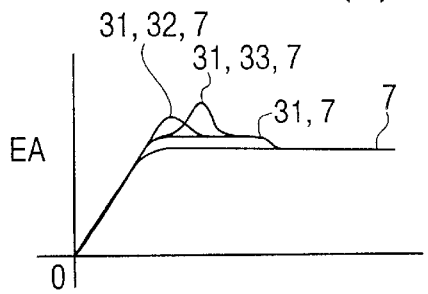

Accordingly, with the EA mechanism of this tenth example, the cut portions 31 and 33 are first simultaneously cut. Following approximate completion of the cutting of the cut portion 32, the two cut portions 31 and 33 are simultaneously cut. Further cutting of the cut portion 31 is still continued even after cutting of the cut portion 33 is completed. As shown in FIG. 10(e), the EA load properties have three mutually differing peak values of EA loads greater than the small constant value, i.e. the set load of the torsion bar 7.

Other configurations, other operations, and other advantages of the seatbelt retractor 1 of the tenth example are the same as those of the seatbelt retractor 1 according to the ninth example.

An arrangement may be conceived wherein the seatbelt retractor 1 according to the above examples is used to restrain passengers in conjunction with other passenger restraining and protecting devices such as airbag devices and the like. In such a case, the restriction load placed on the seatbelt 3 can be appropriately adjusted according to the operation of the other passenger restraining and protecting devices. Thus, the initial restriction of the passenger by the seatbelt 3 is increased before the passenger restraining and protecting functions of the other passenger restraining and protecting devices are effectively exhibited (e.g., with an airbag device, until the passenger hits the airbag) and such that the restriction of the passenger by the seatbelt 3 is decreased after the passenger restraining and protecting functions of the other passenger restraining and protecting devices are exhibited (e.g., with an airbag device, after the passenger hits the inflated airbag). Thus, effectively utilizing the passenger restraining and protecting functions of the other passenger restraining and protecting devices.

The invention based on this tenth example is by no means restricted to the EA load properties shown in FIG. 10(e). Further, various EA load properties can be set. Also, though the fourth through tenth examples involve providing the cut portions to the spool 4 and the cutting blades to the locking base 14, an inverse arrangement may be made wherein the cutting blades are provided to the spool 4 and the cut portions to the locking base 14.

Also, an arbitrary number of one or more cut portions may be provided, and the same number of cutting blades may be correspondingly provided. In the event that multiple cut portions are thus provided, the length of the cut portions in the circumference direction may be set so as to be mutually different, and also the intervals between the blade tips of the cutting blades corresponding to the cut portions can be made to differ so as to variously set the starting time for cutting. Further, the material and shape of the cut portions, the form of the cutting blades (shape of the blade tips), and moreover the amount of the cut portions to be cut by the cutting blades (cutting depth, cutting width, etc.), can be each variously set. Thus, by appropriately combining the length of the cut portions in the circumferential direction, the timing for starting cutting, the material and shape of the cut portions, the form of the cutting blades (shape of the blade tips), and the amount of cutting, the maximum EA load can be variably set, and various restriction load properties can be obtained. Further, an arrangement may be made wherein the cut portion are provided on the locking base 14 side and the cutting blades are provided to the spool 4 side.

As can be clearly understood from the above description, the restriction load properties of the seatbelt load restricting mechanism for the restriction load placed on the seatbelt in the event of an emergency, comprise a relatively small restriction load due to twisting deformation of the torsion bar alone, and a relatively great restriction load made up of a restriction load due to twisting deformation of the torsion bar and a restriction load due to another member. The relatively great restriction load is set to have properties which change in a plurality of steps. Thus, effectively using these restriction load properties allows the restriction load to be variably adjusted in a flexible manner. Accordingly, the kinetic energy of the passenger can be absorbed in an optimally efficient and more appropriate manner. Thus, in the event that the passenger is restrained in conjunction with other passenger restraining and protecting devices, such as airbag devices and the like, the restriction load placed on the seatbelt can be appropriately adjusted according to the operation of other passenger restraining and protecting devices. This can be done such that the initial restriction of the passenger by the seatbelt is increased before the other passenger restraining and protecting devices effectively function and such that the restriction of the passenger by the seatbelt is decreased after the other passenger restraining and protecting devices effectively function. Thus, effectively utilizing the passenger restraining and protecting functions of the other passenger restraining and protecting devices.

As described, the present invention relates to a seatbelt retractor having a load restricting mechanism. Accordingly, it is to be understood that the present invention is not limited to the details of any one embodiment in any one figure, but are defined by the appended claims. The scope of the appended claims should be interpreted to encompass all such modifications, similar arrangements and procedures.

We claim:

1. A seatbelt retractor comprising at least:
   a spool for taking up a seatbelt;
   a lock mechanism having a locking member whereby rotation in the direction of extracting the seatbelt is obstructed in the event of an emergency;

a torsion bar rotatably linking said spool and said locking member, and capable of being deformed by twisting; and a seatbelt load restricting mechanism for restricting the load placed upon said seatbelt wherein said torsion bar deforms by twisting at the time that the rotation of said locking member in the direction of said seatbelt being extracted is obstructed and said spool rotates relative to the extracting direction of said seatbelt;

wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to another member, and wherein said relatively great restriction load is set to have properties which change in at least two steps;

wherein said seatbelt load restricting mechanism further comprises a predetermined number of share pins provided between said spool and said locking member such that a shearing load is placed thereupon at the time of said relative rotation of said spool, wherein said restriction load initially greatly increases the shearing load on said share pins and is set to a constant load by the twisting load of said torsion bar following the shearing destruction of said share pins; and wherein an indented portion is formed in said share pins, and the relative rotation position of said spool is set such that said share pins break under shearing at this indented portion.

2. A seatbelt retractor according to claim 1, wherein the shape of the indentation may be selected from the group consisting of cross-sectional triangular, square cross-sectional, cross-sectional arc-shaped and cross-sectional truncated conical trapezoid.

3. A seatbelt retractor according to claim 1, wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to a first member and a second member, and wherein said relatively great restriction load is set to have properties which change in at least three steps.

4. A restraint system comprising the seatbelt retractor of claim 1 and an airbag.

5. A motor vehicle comprising a chassis and the seatbelt retractor of claim 1.

6. A seatbelt retractor comprising at least:
a spool for taking up a seatbelt;
a lock mechanism having a locking member whereby rotation in the direction of extracting the seatbelt is obstructed in the event of an emergency;
a torsion bar rotatably linking said spool and said locking member, and capable of being deformed by twisting; and
a seatbelt load restricting mechanism for restricting the load placed upon said seatbelt wherein said torsion bar deforms by twisting at the time that the rotation of said locking member in the direction of said seatbelt being extracted is obstructed and said spool rotates relative to the extracting direction of said seatbelt;
wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to another member, and wherein said relatively great restriction load is set to have properties which change in at least two steps;
wherein said seatbelt load restricting mechanism further comprises a predetermined number of share pins provided between said spool and said locking member such that a shearing load is placed thereupon at the time of said relative rotation of said spool, wherein said restriction load initially greatly increases the shearing load on said share pins and is set to a constant load by the twisting load of said torsion bar following the shearing destruction of said share pins; and
wherein said retractor has a plurality of share pins and at least two of the share pins are made of different materials.

7. A seatbelt retractor according to claim 6, wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to a first member and a second member, and wherein said relatively great restriction load is set to have properties which change in at least three steps.

8. A restraint system comprising the seatbelt retractor of claim 6 and an airbag.

9. A motor vehicle comprising a chassis and the seatbelt retractor of claim 6.

10. A seatbelt retractor comprising at least:
a spool for taking up a seatbelt;
a lock mechanism having a locking member whereby rotation in the direction of extracting the seatbelt is obstructed in the event of an emergency;
a torsion bar rotatably linking said spool and said locking member, and capable of being deformed by twisting; and
a seatbelt load restricting mechanism for restricting the load placed upon said seatbelt wherein said torsion bar deforms by twisting at the time that the rotation of said locking member in the direction of said seatbelt being extracted is obstructed and said spool rotates relative to the extracting direction of said seatbelt;
wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to another member, and wherein said relatively great restriction load is set to have properties which change in at least two steps;
wherein said seatbelt load restricting mechanism further comprises a predetermined number of share pins provided between said spool and said locking member such that a shearing load is placed thereupon at the time of said relative rotation of said spool, wherein said restriction load initially greatly increases the shearing load on said share pins and is set to a constant load by the twisting load of said torsion bar following the shearing destruction of said share pins; and
wherein a plurality of said share pins are provided, and the relative rotational position of said spool where said share pins break under shearing is set so as to be different for each share pin.

11. A seatbelt retractor according to claim 10, wherein the form of the share pins is selected from the group consisting of the perimeters of the edge planes of the cylindrical member are rounded, the perimeter of the edge planes of the cylindrical member are formed into spherical shapes, the perimeter of the edge planes of the cylindrical member are chamfered, the perimeter of the cylindrical member is curved in a concave form, a cross-sectional half-moon form, a cross-sectional triangular form, a cross-sectional polygon form with more than three sides, the perimeter of the cylindrical member is threaded, a tapered cylindrical form, and a groove-shaped indentation formed on the entire perimeter of the cylindrical member.

12. A seatbelt retractor according to claim 10, wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to a first member and a second member, and wherein said relatively great restriction load is set to have properties which change in at least three steps.

13. A restraint system comprising the seatbelt retractor of claim 10 and an airbag.

14. A motor vehicle comprising a chassis and the seatbelt retractor of claim 10.

15. A seatbelt retractor comprising at least:
a spool for taking up a seatbelt;
a lock mechanism having a locking member whereby rotation in the direction of extracting the seatbelt is obstructed in the event of an emergency;
a torsion bar rotatably linking said spool and said locking member, and capable of being deformed by twisting; and
seatbelt load restricting mechanism for restricting the load placed upon said seatbelt wherein said torsion bar deforms by twisting at the time that the rotation of said locking member in the direction of said seatbelt being extracted is obstructed and said spool rotates relative to the extracting direction of said seatbelt;
wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to another member, and wherein said relatively great restriction load is set to have properties which change in at least two steps;
wherein said seatbelt load restricting mechanism further comprises a predetermined number of share pins provided between said spool and said locking member such that a shearing load is placed thereupon at the time of said relative rotation of said spool, wherein said restriction load initially greatly increases the shearing load on said share pins and is set to a constant load by the twisting load of said torsion bar following the shearing destruction of said share pins; and
wherein a plurality of said share pins are provided, and at least one share pin is in an arc-shaped slot in either of said spool or locking member.

16. A seatbelt retractor according to claim 15, wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to a first member and a second member, and wherein said relatively great restriction load is set to have properties which change in at least three steps.

17. A restraint system comprising the seatbelt retractor of claim 15 and an airbag.

18. A motor vehicle comprising a chassis and the seatbelt retractor of claim 15.

19. A seatbelt retractor comprising at least:
a spool for taking up a seatbelt;
a lock mechanism having a locking member whereby rotation in the direction of extracting the seatbelt is obstructed in the event of an emergency;
a torsion bar rotatably linking said spool and said locking member, and capable of being deformed by twisting; and
a seatbelt load restricting mechanism for restricting the load placed upon said seatbelt wherein said torsion bar deforms by twisting at the time that the rotation of said locking member in the direction of said seatbelt being extracted is obstructed and said spool rotates relative to the extracting direction of said seatbelt;
wherein the restriction load properties of said seatbelt load restricting mechanism comprise a relatively small restriction load due to twisting deformation of said torsion bar alone, and a relatively great restriction load made up of a restriction load due to twisting deformation of said torsion bar and a restriction load due to another member, and wherein said relatively great restriction load is set to have properties which change in at least two steps;
wherein said seatbelt load restricting mechanism further comprises a cut portion provided to one of said spool and said locking member, and a cutting blade which is provided to the other of said spool and said locking member and which cuts this cut portion at the time of relative rotation of said spool, wherein said restriction load initially rises greatly due to the cutting resistance at the time of said cutting blade cutting said cut portion but is set at a constant load due to twisting deformation of said torsion bar following completion of cutting of said cut portion.

20. A seatbelt retractor according to claim 19, wherein a plurality of said cut portions are provided, and wherein a plurality of cutting blades are provided corresponding to these cut portions, and the relative rotation position of said spool where these cut portions are cut by said corresponding cutting blades is set so as to be different for each cut portion.

* * * * *